US010370497B2

(12) United States Patent
Stapleton

(10) Patent No.: US 10,370,497 B2
(45) Date of Patent: Aug. 6, 2019

(54) METHOD FOR PRODUCING A CROSS-LINKED SILOXANE NETWORK

(71) Applicant: Milliken & Company, Spartanburg, SC (US)

(72) Inventor: Russell A. Stapleton, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 15/664,846

(22) Filed: Jul. 31, 2017

(65) Prior Publication Data

US 2018/0057637 A1    Mar. 1, 2018

Related U.S. Application Data

(60) Provisional application No. 62/378,452, filed on Aug. 23, 2016.

(51) Int. Cl.
| | |
|---|---|
| *C08G 77/06* | (2006.01) |
| *C08G 77/26* | (2006.01) |
| *C08G 77/08* | (2006.01) |
| *C08L 83/04* | (2006.01) |
| *C08G 77/04* | (2006.01) |

(52) U.S. Cl.
CPC ............. *C08G 77/06* (2013.01); *C08G 77/08* (2013.01); *C08G 77/26* (2013.01); *C08L 83/04* (2013.01); *C08G 77/045* (2013.01)

(58) Field of Classification Search
USPC ...................................................... 528/10–43
See application file for complete search history.

(56) References Cited

U.S. PATENT DOCUMENTS

| | | | | |
|---|---|---|---|---|
| 3,477,988 A | * | 11/1969 | Ostrozynski | ........... C08G 77/10 |
| | | | | 502/162 |
| 4,447,498 A | * | 5/1984 | Fink | ........................ B32B 13/08 |
| | | | | 428/447 |
| 4,661,577 A | * | 4/1987 | Jo Lane | ............ D06M 15/6436 |
| | | | | 106/18.12 |
| 5,330,836 A | * | 7/1994 | Buese | ....................... C08K 9/06 |
| | | | | 106/490 |
| 5,635,547 A | | 6/1997 | Takahashi et al. | |
| 2014/0306259 A1 | | 10/2014 | Liu et al. | |
| 2014/0309380 A1 | | 10/2014 | Liu et al. | |
| 2014/0309448 A1 | | 10/2014 | Liu et al. | |
| 2014/0309450 A1 | | 10/2014 | Liu | |
| 2015/0141608 A1 | * | 5/2015 | Ko | .......................... H01L 33/56 |
| | | | | 528/32 |
| 2017/0158859 A1 | * | 6/2017 | Yoshii | ...................... C08K 9/06 |

OTHER PUBLICATIONS

Machine generated translation of the claims and Specification of JP 2017-105897.*
PCT/US2017/044695 International Search Report, filed Jul. 31, 2016, 4 pages.
PCT/US2017/044695 Written Opinion of the International Searching Authority, filed Jul. 31, 2016, 7 pages.

* cited by examiner

*Primary Examiner* — Marc S Zimmer
(74) *Attorney, Agent, or Firm* — Robert M. Lanning

(57) ABSTRACT

A method for producing a cross-linked siloxane network comprises the steps of: (a) providing a first part comprising (i) a first siloxane compound comprising at least one cyclic siloxane moiety, (ii) an inorganic particulate material, and (iii) an aminosilane compound, (b) providing a second part, the second part comprising a hydroxide salt, (c) combining the first part and the second part to produce a reaction mixture, (d) heating the reaction mixture to a temperature sufficient for the hydroxide salt to open the ring of the cyclic siloxane moiety, and (e) maintaining the reaction mixture at an elevated temperature so that at least a portion of the opened cyclic siloxane moieties react to produce a cross-linked siloxane network.

15 Claims, No Drawings

METHOD FOR PRODUCING A CROSS-LINKED SILOXANE NETWORK

CROSS-REFERENCE TO RELATED APPLICATIONS

This application claims, pursuant to 35 U.S.C. § 119(e), priority to and the benefit of the filing date of U.S. Patent Application No. 62/378,452, which was filed on Aug. 23, 2016.

TECHNICAL FIELD OF THE INVENTION

This application is directed to a method for producing a cross-linked siloxane network, such as those found in silicone elastomers.

BACKGROUND

Siloxane compounds and silicones have found many uses in modern industry. For example, siloxane compounds are widely used in the production of cross-linked silicone polymers. These polymers typically are produced by either a hydrosilylation reaction or a condensation reaction. In the hydrosilylation reaction, siloxane compounds bearing vinyl groups undergo addition to link individual molecules of the compounds through the formation of new Si—C bonds. The hydrosilylation reaction typically is catalyzed by platinum, which contributes to the cost of these polymers since the platinum cannot be recovered from the cured elastomer. In the condensation reaction, the siloxane compounds react in a condensation reaction to form new Si—O—Si linkages between individual molecules. This condensation reaction produces volatile organic compounds (VOCs) as a by-product.

An alternative method for producing cross-linked silicone polymers utilizes starting materials containing cyclic siloxane moieties. In the polymerization reaction, these starting materials are combined with a suitable base. The base attacks and breaks some of the siloxane linkages present in the cyclic siloxane moieties. When these siloxane linkages are broken, the two ends of the broken siloxane linkage are converted to silanolate ions. These silanolate ions then react with other silanolate ions and/or siloxane linkages (e.g., siloxane linkages in the cyclic siloxane moieties present on other molecules of the starting materials) to produce new siloxane linkages and cross-links between the different molecules of the starting materials. The product of this reaction is a cross-linked silicone polymer. Typically, a strong base is employed to ensure that the polymerization reaction proceeds quickly and to the desired degree. To achieve optimal hardness, these systems typically are cured at temperatures of 70-100° C. However, at such cure temperatures, the reaction mixture takes a relatively long time to gel. While this extended gel time may not be detrimental for certain uses, the extended gel time has been found to be problematic when certain particulate materials are added to the mixture, such as LED phosphors. In such instances, the phosphors, which are relatively dense, can settle before the reaction mixture gels. In order to shorten the gel time, higher temperatures can be used, but these higher temperatures can deleteriously affect the hardness of the cured siloxane network (silicone polymer).

A need therefore remains for compositions and methods that are capable of producing high quality cross-linked siloxane networks (e.g., cross-linked silicone polymers) under the desired conditions. The compositions and methods described herein seek to address this unmet need.

BRIEF SUMMARY OF THE INVENTION

In a first embodiment, the invention provides a method for producing a cross-linked siloxane network comprising the steps of:

(a) providing a first part comprising (i) a first siloxane compound comprising at least one cyclic siloxane moiety, (ii) an inorganic particulate material, and (iii) an aminosilane compound, wherein, optionally, at least a portion of the aminosilane compound is disposed on the surface of the inorganic particulate material;

(b) providing a second part, the second part comprising a hydroxide salt;

(c) combining the first part and the second part to produce a reaction mixture;

(d) heating the reaction mixture to a temperature sufficient for the hydroxide salt to open the ring of the cyclic siloxane moiety; and (e) maintaining the reaction mixture at an elevated temperature so that at least a portion of the opened cyclic siloxane moieties react to produce a cross-linked siloxane network.

DETAILED DESCRIPTION OF THE INVENTION

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom, a nitrogen atom, or a sulfur atom.

As used herein, the term "alkenyl groups" refers to univalent functional groups derived from acyclic, unbranched and branched olefins (i.e., hydrocarbons having one or more carbon-carbon double bonds) by removal of a hydrogen atom from a carbon atom of the olefin.

As used herein, the term "substituted alkenyl groups" refers to univalent functional groups derived from acyclic, substituted olefins by removal of a hydrogen atom from a carbon atom of the olefin. In this definition, the term "substituted olefins" refers to compounds derived from acyclic, unbranched and branched hydrocarbons having one or more carbon-carbon double bonds in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "cycloalkenyl groups" refers to univalent functional groups derived from cyclic olefins (i.e., non-aromatic, monocyclic and polycyclic hydrocarbons having one or more carbon-carbon double bonds) by removal of a hydrogen atom from a carbon atom of the olefin. The carbon atoms in the cyclic olefins can be substituted with alkyl groups and/or alkenyl groups.

As used herein, the term "substituted cycloalkenyl groups" refers to univalent functional groups derived from substituted cyclic olefins by removal of a hydrogen atom from a carbon atom of the cyclic olefin. In this definition, the term "substituted cyclic olefins" refers to compounds derived from non-aromatic, monocyclic and polycyclic hydrocarbons having one or more carbon-carbon double bonds in which one or more of the hydrogen atoms of the hydrocarbon is replaced with a non-hydrogen atom (e.g., a halogen atom) or a non-alkyl functional group (e.g., hydroxy group, aryl group, heteroaryl group).

As used herein, the term "heterocyclyl groups" refers to univalent functional groups derived from heterocyclic compounds by removal of a hydrogen atom from an atom in the cyclic portion of the heterocyclic compound. In this definition, the term "heterocyclic compounds" refers to compounds derived from non-aromatic, monocyclic and polycyclic compounds having a ring structure composed of atoms of at least two different elements. These heterocyclic compounds can also comprise one or more double bonds.

As used herein, the term "substituted heterocyclyl groups" refers to univalent functional groups derived from substituted heterocyclic compounds by removal of a hydrogen atom from an atom in the cyclic portion of the compound. In this definition, the term "substituted heterocyclic compounds" refers to compounds derived from non-aromatic, monocyclic and polycyclic compounds having a ring structure composed of atoms of at least two different elements where one or more of the hydrogen atoms of the cyclic compound is replaced with a non-hydrogen atom (e.g., a halogen atom) or a functional group (e.g., hydroxy group, alkyl group, aryl group, heteroaryl group). These substituted heterocyclic compounds can also comprise one or more double bonds.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., hydroxy group).

As used herein, the term "substituted heteroaryl groups" refers to univalent functional groups derived from substituted heteroarenes by removal of a hydrogen atom from a ring carbon atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., hydroxy group) and (2) at least one methine group (—C═) of the hydrocarbon is replaced by a trivalent heteroatom and/or at least one vinylidene group (—CH═CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "alkenediyl groups" refers to divalent functional groups derived from acyclic, unbranched and branched olefins (i.e., hydrocarbons having one or more carbon-carbon double bonds) by removal of two hydrogen atoms from the olefin. These hydrogen atoms can be removed from the same carbon atom on the olefin (as in but-2-ene-1,1-diyl) or from different carbon atoms (as in but-2-ene-1,4-diyl).

As used herein, the term "acyl groups" refers to univalent functional groups derived from alkyl carboxylic acids by removal of a hydroxy group from a carboxylic acid group. In this definition, the term "alkyl carboxylic acids" refers to acyclic, unbranched and branched hydrocarbons having one or more carboxylic acid groups.

As used herein, the term "substituted acyl groups" refers to univalent functional groups derived from substituted alkyl carboxylic acids by removal of a hydroxy group from a carboxylic acid group. In this definition, the term "substituted alkyl carboxylic acids" refers to compounds having one or more carboxylic acid groups bonded to a substituted alkane, and the term "substituted alkane" is defined as it is above in the definition of substituted alkyl groups.

As used herein, the term "siloxy groups" refers to univalent functional groups having the structure —[OSiR$_x$R$_y$]$_g$R$_z$, where R$_x$, R$_y$, and R$_z$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups and the variable g is an integer equal to or greater than 1. In a preferred embodiment, R$_x$, R$_y$, and R$_z$ are independently selected from the group consisting of alkyl groups (e.g., $C_1$-$C_8$ alkyl groups), and the variable g is an integer from 1 to 50, more preferably 1 to 20.

In a first embodiment, the invention provides a method for producing a cross-linked siloxane network comprising the steps of (a) providing a first part comprising (i) a first siloxane compound comprising at least one cyclic siloxane moiety, (ii) an inorganic particulate material, and (iii) an aminosilane compound; (b) providing a second part, the second part comprising a hydroxide salt; (c) combining the first part and the second part to produce a reaction mixture; (d) heating the reaction mixture to a temperature sufficient for the hydroxide salt to open the ring of the cyclic siloxane moiety; and (e) maintaining the reaction mixture at an elevated temperature so that at least a portion of the opened cyclic siloxane moieties react to produce a cross-linked siloxane network.

In a preferred embodiment, the first part comprises a siloxane compound selected from the group consisting of compounds conforming to the structure of Formula (X) below

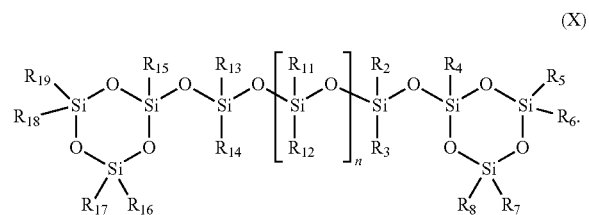

(X)

In the structure of Formula (X), $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups. At least one of $R_7$ and $R_8$ is different from each of $R_2$, $R_3$, $R_4$, $R_5$, and $R_6$, and at least one of $R_{16}$ and $R_{17}$ is different from each of $R_{13}$, $R_{14}$, $R_{15}$, $R_{18}$, and $R_{19}$. The variable n is selected from the group consisting of integers equal to or greater than 1.

In a preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups. More preferably, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups and substituted alkyl groups, with $C_1$-$C_8$ alkyl groups and $C_1$-$C_8$ substituted alkyl groups being particularly preferred. More preferably, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, with $C_1$-$C_8$ alkyl groups being particularly preferred. In a particularly preferred embodiment, $R_2$, $R_3$, $R_4$, $R_5$, $R_6$, $R_{13}$, $R_{14}$, $R_{15}$, $R_{18}$, and $R_{19}$ are methyl groups.

In another preferred embodiment, $R_{11}$ and $R_{12}$ are independently selected from the group consisting of haloalkyl groups, aralkyl groups, aryl groups, substituted aryl groups, heteroaryl groups, and substituted heteroaryl groups. More preferably, $R_{11}$ and $R_{12}$ are independently selected from the group consisting of aryl groups, substituted aryl groups, heteroaryl groups, and substituted heteroaryl groups, with $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups being particularly preferred. More preferably, $R_{11}$ and $R_{12}$ are independently selected from the group consisting of aryl groups and substituted aryl groups, with $C_6$-$C_{10}$ aryl groups and $C_6$-$C_{12}$ substituted aryl groups being particularly preferred. More preferably, $R_{11}$ and $R_{12}$ are independently selected from the group consisting of aryl groups, with $C_6$-$C_{10}$ aryl groups being particularly preferred. In a particularly preferred embodiment, $R_{11}$ and $R_{12}$ are phenyl groups.

In another preferred embodiment, $R_7$, $R_8$, $R_{16}$, and $R_{17}$ are independently selected from the group consisting of haloalkyl groups, aralkyl groups, aryl groups, substituted aryl groups, heteroaryl groups, and substituted heteroaryl groups. More preferably, $R_7$, $R_8$, $R_{16}$, and $R_{17}$ are independently selected from the group consisting of aryl groups, substituted aryl groups, heteroaryl groups, and substituted heteroaryl groups, with $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups being particularly preferred. More preferably, $R_7$, $R_8$, $R_{16}$, and $R_{17}$ are independently selected from the group consisting of aryl groups and substituted aryl groups, with $C_6$-$C_{10}$ aryl groups and $C_6$-$C_{12}$ substituted aryl groups being particularly preferred. More preferably, $R_7$, $R_8$, $R_{16}$, and $R_{17}$ are independently selected from the group consisting of aryl groups, with $C_6$-$C_{10}$ aryl groups being particularly preferred. In a particularly preferred embodiment, $R_7$, $R_8$, $R_{16}$, and $R_{17}$ are phenyl groups.

In a particularly preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups, and $R_7$, $R_8$, $R_{11}$, $R_{12}$, $R_{16}$, and $R_{17}$ are independently selected from the group consisting of haloalkyl groups, aralkyl groups, aryl groups, substituted aryl groups, heteroaryl groups, and substituted heteroaryl groups. In a more specific embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups and substituted alkyl groups, and $R_7$, $R_8$, $R_{11}$, $R_{12}$, $R_{16}$, and $R_{17}$ are independently selected from the group consisting of aryl groups, substituted aryl groups, heteroaryl groups, and substituted heteroaryl groups. In yet another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of $C_1$-$C_8$ alkyl groups and $C_1$-$C_8$ substituted alkyl groups, and $R_7$, $R_8$, $R_{11}$, $R_{12}$, $R_{16}$, and $R_{17}$ are independently selected from the group consisting of $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, and $R_7$, $R_8$, $R_{11}$, $R_{12}$, $R_{16}$, and $R_{17}$ are independently selected from the group consisting of aryl groups and substituted aryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of $C_1$-$C_8$ alkyl groups, and $R_7$, $R_8$, $R_{11}$, $R_{12}$, $R_{16}$, and $R_{17}$ are independently selected from the group consisting of $C_6$-$C_{10}$ aryl groups, and $C_6$-$C_{12}$ substituted aryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, and $R_7$, $R_8$, $R_{11}$, $R_{12}$, $R_{16}$, and $R_{17}$ are independently selected from the group consisting of aryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of $C_1$-$C_8$ alkyl groups, and $R_7$, $R_8$, $R_{11}$, $R_{12}$, $R_{16}$, and $R_{17}$ are independently selected from the group consisting of $C_6$-$C_{10}$ aryl groups. In yet another specific preferred embodiment, $R_2$, $R_3$, $R_4$, $R_5$, $R_6$, $R_{13}$, $R_{14}$, $R_{15}$, $R_{18}$, and $R_{19}$ are methyl groups, and $R_7$, $R_8$, $R_{11}$, $R_{12}$, $R_{16}$, and $R_{17}$ are phenyl groups.

In another preferred embodiment, the first part comprises a siloxane compound selected from the group consisting of compounds conforming to the structure of Formula (XX) below

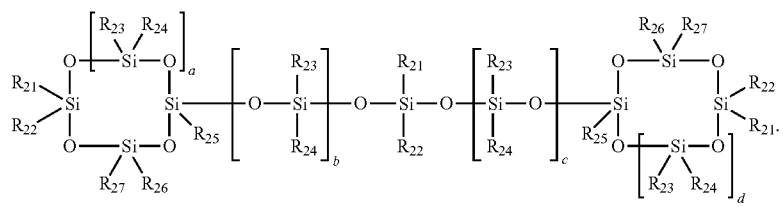

(XX)

In the structure of Formula (XX), the variables a, b, c, and d are integers selected from the group consisting of 0 and 1. The sum of a and b is equal to 1, and the sum of c and d is equal to 1. $R_{21}$, $R_{22}$, $R_{23}$, $R_{24}$, $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups. At least one of $R_{21}$ and $R_{22}$ is different from each of $R_{23}$, $R_{24}$, $R_{25}$, $R_{26}$, and $R_{27}$.

In a preferred embodiment, at least one of the variables a and d is 0. More preferably, both variables a and d are 0.

In a preferred embodiment, $R_{23}$, $R_{24}$, $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups. More preferably, $R_{23}$, $R_{24}$, $R_{25}$, $R_{26}$, and $R_{27}$ are independently selected from the group consisting of alkyl groups and substituted alkyl groups, with $C_1$-$C_8$ alkyl groups and $C_1$-$C_8$ substituted alkyl groups being particularly preferred. More preferably, $R_{23}$, $R_{24}$, $R_{25}$, $R_{26}$, and $R_{27}$ are independently selected from the group consisting of alkyl groups, with $C_1$-$C_8$ alkyl groups being particularly preferred. In a particularly preferred embodiment, $R_{23}$, $R_{24}$, $R_{25}$, $R_{26}$, and $R_{27}$ are methyl groups.

In another preferred embodiment, $R_{21}$ and $R_{22}$ are independently selected from the group consisting of haloalkyl groups, aralkyl groups, aryl groups, substituted aryl groups, heteroaryl groups, and substituted heteroaryl groups. More preferably, $R_{21}$ and $R_{22}$ are independently selected from the group consisting of aryl groups, substituted aryl groups, heteroaryl groups, and substituted heteroaryl groups, with $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups being particularly preferred. More preferably, $R_{21}$ and $R_{22}$ are independently selected from the group consisting of aryl groups and substituted aryl groups, with $C_6$-$C_{10}$ aryl groups and $C_6$-$C_{12}$ substituted aryl groups being particularly preferred. More preferably, $R_{21}$ and $R_{22}$ are independently selected from the group consisting of aryl groups, with $C_6$-$C_{10}$ aryl groups being particularly preferred. In a particularly preferred embodiment, $R_{21}$ and $R_{22}$ are phenyl groups.

In a particularly preferred embodiment, the variables a and d are 0, the variables b and c are 1, $R_{23}$, $R_{24}$, $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups, and $R_{21}$ and $R_{22}$ are independently selected from the group consisting of haloalkyl groups, aralkyl groups, aryl groups, substituted aryl groups, heteroaryl groups, and substituted heteroaryl groups. In a more specific embodiment, the variables a and d are 0, the variables b and c are 1, $R_{23}$, $R_{24}$, $R_{25}$, $R_{26}$, and $R_{27}$ are independently selected from the group consisting of alkyl groups and substituted alkyl groups, and $R_{21}$ and $R_{22}$ are independently selected from the group consisting of aryl groups, substituted aryl groups, heteroaryl groups, and substituted heteroaryl groups. In yet another specific preferred embodiment, the variables a and d are 0, the variables b and c are 1, $R_{23}$, $R_{24}$, $R_{25}$, $R_{26}$, and $R_{27}$ are independently selected from the group consisting of $C_1$-$C_8$ alkyl groups and $C_1$-$C_8$ substituted alkyl groups, and $R_{21}$ and $R_{22}$ are independently selected from the group consisting of $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of alkyl groups, and $R_{21}$ and $R_{22}$ are independently selected from the group consisting of aryl groups and substituted aryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of $C_1$-$C_8$ alkyl groups, and $R_{21}$ and $R_{22}$ are independently selected from the group consisting of $C_6$-$C_{10}$ aryl groups and $C_6$-$C_{12}$ substituted aryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of alkyl groups, and $R_{21}$ and $R_{22}$ are independently selected from the group consisting of aryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of $C_1$-$C_8$ alkyl groups, and $R_{21}$ and $R_{22}$ are independently selected from the group consisting of $C_6$-$C_{10}$ aryl groups. In yet another specific preferred embodiment, the variables a and d are 0, the variables b and c are 1, $R_{23}$, $R_{24}$, $R_{25}$, $R_{26}$, and $R_{27}$ are methyl groups, and $R_{21}$ and $R_{22}$ are phenyl groups.

In another preferred embodiment, the first part comprises a siloxane compound comprising a plurality of siloxane repeating units, wherein about 10 mol. % or more of the siloxane repeating units are cyclotrisiloxane repeating units. The cyclotrisiloxane repeating units preferably are independently selected from the group consisting of cyclotrisiloxane repeating units conforming to the structure of Formula (XL) below:

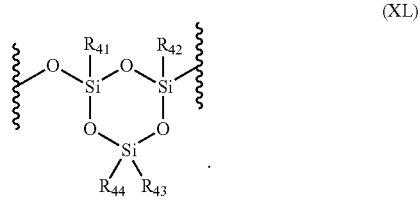

(XL)

In the structure of Formula (XL), $R_{41}$ and $R_{42}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups. $R_{43}$ and $R_{44}$ are independently selected from the group consisting of haloalkyl groups, aralkyl groups, aryl groups, substituted aryl groups, heteroaryl groups, and substituted heteroaryl groups.

This siloxane compound can be any suitable siloxane compound possessing the amount of cyclotrisiloxane moieties recited above. Suitable siloxane compounds and methods for making the same are described, for example, in U.S. patent application Ser. No. 14/244,193 filed on Apr. 3, 2014, which application published as U.S. Patent Application Publication No. US 2014/0309448 A1 on Oct. 16, 2014 and is hereby incorporated by reference for its disclosure of such siloxane compounds and processes for making the same. In the structure of Formula (XL) and the structures that follow, the partial bonds (i.e., the bonds truncated by the wavy line) represent bonds to adjacent moieties or repeating units within the second siloxane compound. In a preferred embodiment, $R_{41}$ and $R_{42}$ are independently selected from the group consisting of alkyl groups and substituted alkyl groups, and $R_{43}$ and $R_{44}$ are independently selected from the group consisting of haloalkyl groups, aralkyl groups, and aryl groups. In a more specific preferred embodiment, $R_{41}$ and $R_{42}$ are independently selected from the group consisting of $C_1$-$C_8$ alkyl groups and $C_1$-$C_8$ substituted alkyl groups, and $R_{43}$ and $R_{44}$ are independently selected from the group consisting of $C_1$-$C_8$ haloalkyl groups, $C_6$-$C_{10}$ aryl groups, and $C_7$-$C_{31}$ aralkyl groups. In another preferred embodiment, $R_{41}$ and $R_{42}$ are independently selected from the group consisting of $C_1$-$C_8$ alkyl groups, and $R_{43}$ and $R_{44}$ are independently selected from the group consisting of $C_6$-$C_{10}$ aryl groups. In another preferred embodiment, $R_{41}$ and $R_{42}$ are methyl groups, and $R_{43}$ and $R_{44}$ are phenyl groups.

The siloxane compound can comprise any suitable amount of siloxane repeating units conforming to the structure of Formula (XL). Preferably, about 10 mol. % or more of the siloxane repeating units in the siloxane compound conform to the structure of Formula (XL). More preferably, about 15 mol. % or more, about 20 mol. % or more, about 25 mol. % or more, about 30 mol. % or more, about 35 mol. % or more, about 40 mol. % or more, about 45 mol. % or more, about 50 mol. % or more, about 55 mol. % or more, about 60 mol. % or more, about 65 mol. % or more, about 70 mol. % or more, about 75 mol. % or more, about 80 mol. % or more, about 85 mol. % or more, or about 90 mol. % or more of the siloxane repeating units in the siloxane compound conform to the structure of Formula (XL).

The cyclotrisiloxane repeating units present in this siloxane compound possess the same basic structure (i.e., a structure conforming to Formula (XL)), but all of the repeating units are not necessarily substituted with the same groups. In other words, the siloxane compound can contain cyclotrisiloxane repeating units that differ in the selection of the $R_{41}$, $R_{42}$, $R_{43}$, and $R_{44}$ substituents.

This siloxane compound can comprise siloxane units in addition to those conforming to the structure of Formula (XL). For example, in a preferred embodiment, the siloxane compound can comprise one or more siloxane moieties conforming to the structure of Formula (L) below:

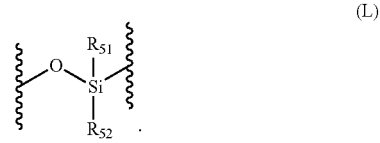

(L)

In the structure of Formula (L), $R_{51}$ and $R_{52}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups. More preferably, $R_{51}$ and $R_{52}$ are independently selected from the group consisting of $C_1$-$C_{30}$ alkyl groups (e.g., $C_1$-$C_8$ alkyl groups), $C_2$-$C_{30}$ alkenyl groups (e.g., $C_2$-$C_8$ alkenyl groups), $C_1$-$C_{30}$ haloalkyl groups (e.g., $C_1$-$C_8$ haloalkyl groups), $C_6$-$C_{30}$ aryl groups (e.g., $C_6$-$C_{10}$ aryl groups), $C_7$-$C_{31}$ aralkyl groups, $C_3$-$C_9$ trialkylsiloxy groups, $C_8$-$C_{26}$ aryldialkylsiloxy groups, $C_{13}$-$C_{28}$ alkyldiarylsiloxy groups, and $C_{18}$-$C_{30}$ triarylsiloxy groups. More preferably, $R_{51}$ and $R_{52}$ are independently selected from the group consisting of $C_1$-$C_8$ alkyl groups, $C_1$-$C_8$ haloalkyl groups, $C_6$-$C_{10}$ aryl groups, and $C_7$-$C_{31}$ aralkyl groups. Most preferably, $R_{51}$ and $R_{52}$ are independently selected from the group consisting of $C_1$-$C_8$ alkyl groups, with methyl groups being particularly preferred.

The structures drawn above only represent repeating units within this siloxane compound. The siloxane compound further comprises terminating groups. These terminating groups can be any suitable terminating group for a siloxane compound. In a preferred embodiment, the siloxane compound further comprises silyl terminating groups. Suitable silyl terminating groups include, but are not limited to, trialkylsilyl groups, such as trimethylsilyl groups.

This siloxane compound preferably is an oligomeric or polymeric siloxane compound comprising multiple siloxane moieties including the cyclotrisiloxane moieties described above. Preferably, the siloxane compound has a number average molar mass of about 1,000 g/mol or more. The number average molar mass (Mn) of the siloxane compound is more preferably about 2,000 g/mol or more, about 3,000 g/mol or more, or about 4,000 g/mol or more. Preferably, the siloxane compound has a mass average molar mass (Mw) that is at least 50% greater than the number average molar mass of the compound. In a series of preferred embodiments, the siloxane compound has a mass average molar mass of about 8,000 g/mol or more, about 10,000 g/mol or more, about 11,000 g/mol or more, or about 12,000 g/mol or more.

In another preferred embodiment, the first part comprises a siloxane compound selected from the group consisting of compounds conforming to the structure of Formula (LX) below

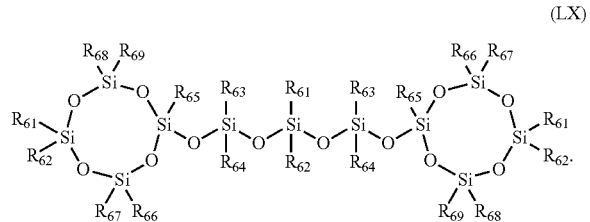

(LX)

In the structure of Formula (LX), $R_{61}$ and $R_{62}$ are independently selected from the group consisting of haloalkyl groups, aralkyl groups, aryl groups, substituted aryl groups, heteroaryl groups, and substituted heteroaryl groups. $R_{63}$, $R_{64}$, $R_{65}$, $R_{66}$, $R_{67}$, $R_{68}$, and $R_{69}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

Siloxane compounds conforming to the structure of Formula (LX) are described, for example, in U.S. patent application Ser. No. 14/244,264 filed on Apr. 3, 2014, which application published as U.S. Patent Application Publication No. US 2014/0309450 A1 on Oct. 16, 2014 and is hereby incorporated by reference for its disclosure of such siloxane compounds and processes for making the same. In a preferred embodiment, $R_{63}$, $R_{64}$, $R_{66}$, $R_{67}$, $R_{68}$, and $R_{69}$ are independently selected from the group consisting of alkyl groups and substituted alkyl groups, and $R_{61}$, $R_{62}$, and $R_{65}$ are independently selected from the group consisting of haloalkyl groups, aralkyl groups, and aryl groups. In a more specific preferred embodiment, $R_{63}$, $R_{64}$, $R_{66}$, $R_{67}$, $R_{68}$, and $R_{69}$ are independently selected from the group consisting of $C_1$-$C_8$ alkyl groups and $C_1$-$C_8$ substituted alkyl groups, and $R_{61}$, $R_{62}$, and $R_{65}$ are independently selected from the group consisting of $C_1$-$C_8$ haloalkyl groups, $C_6$-$C_{10}$ aryl groups, and $C_7$-$C_{31}$ aralkyl groups. In another preferred embodiment, $R_{63}$, $R_{64}$, $R_{66}$, $R_{67}$, $R_{68}$, and $R_{69}$ are independently selected from the group consisting of $C_1$-$C_8$ alkyl groups, and $R_{61}$, $R_{62}$, and $R_{65}$ are independently selected from the group consisting of $C_6$-$C_{10}$ aryl groups. In another preferred embodiment, $R_{63}$, $R_{64}$, $R_{66}$, $R_{67}$, $R_{68}$, and $R_{69}$ are methyl groups, and $R_{61}$, $R_{62}$, and $R_{65}$ are phenyl groups.

As noted above, the first part comprises a first siloxane compound, and this first siloxane compound can be any of the particular siloxane compounds described above (i.e., siloxane compounds conforming to the structure of Formula (X), siloxane compounds conforming to the structure of Formula (XX), siloxane compounds comprising cyclotrisiloxane moieties conforming to the structure of Formula (XL), and siloxane compounds conforming to the structure of Formula (LX)). The first part can comprise other siloxane compounds in addition to the first siloxane compound described above. In a preferred embodiment, the first part comprises a second siloxane compound, and the second siloxane compound comprises at least one cyclic siloxane moiety. More preferably, the second siloxane compound comprises two or more cyclic siloxane moieties. Like the first siloxane compound, this second siloxane compound can be an oligomeric siloxane compound or a polymeric siloxane compound. In a preferred embodiment, the first part comprises at least two siloxane compounds selected from the various groups described above (i.e., siloxane compounds conforming to the structure of Formula (X), siloxane compounds conforming to the structure of Formula (XX), siloxane compounds comprising cyclotrisiloxane moieties conforming to the structure of Formula (XL), and siloxane compounds conforming to the structure of Formula (LX)). In one particular preferred embodiment, the first part comprises a first siloxane compound selected from the group consisting of compounds conforming to the structure of Formula (XX) and a second siloxane compound selected from the group consisting of compounds comprising cyclotrisiloxane moieties conforming to the structure of Formula (XL). In another preferred embodiment, the first part comprises a first siloxane compound selected from the group consisting of compounds conforming to the structure of Formula (XX), a second siloxane compound selected from the group consisting of compounds comprising cyclotrisiloxane moieties conforming to the structure of Formula (XL), and a third siloxane compound selected from the group consisting of siloxane compounds conforming to the structure of Formula (LX).

In those embodiments of the method in which the first part comprises more than one siloxane compound, the different siloxane compounds can be present in the first part in any suitable relative amounts. For example, the first siloxane compound (e.g., a compound conforming to the structure of Formula (XX)) and the second siloxane compound (e.g., a compound comprising cyclotrisiloxane moieties conforming to the structure of Formula (XL)) can be present in a ratio of about 1 part or more of the first siloxane compound to about 1 part of the second siloxane compound. Preferably, the first siloxane compound (e.g., a compound conforming to the structure of Formula (XX)) and the second siloxane compound (e.g., a compound comprising cyclotrisiloxane moieties conforming to the structure of Formula (XL)) are present in a ratio of about 2 parts or more (e.g., about 3 parts) of the first siloxane compound to about 1 part of the second siloxane compound. In those embodiments comprising the third siloxane compound, the third siloxane compound (e.g., a compound conforming to the structure of Formula (LX)) can be present in the first part in a ratio of about 1 part or more of the first siloxane compound (e.g., a compound conforming to the structure of Formula (XX)) to about 1 part of the third siloxane compound. More preferably, the third siloxane compound (e.g., a compound conforming to the structure of Formula (LX)) can be present in the first part in a ratio of about 2 parts or more, about 3 parts or more, or about 4 parts or more of the first siloxane compound (e.g., a compound conforming to the structure of Formula (XX)) to about 1 part of the third siloxane compound.

As noted above, the first part comprises an inorganic particulate material in addition to the first siloxane compound. The inorganic particulate material can be any suitable inorganic particulate material. In a preferred embodiment, the inorganic particulate material comprises a plurality of hydroxy groups disposed on its surface. Suitable examples of such inorganic particulate materials include, but are not limited to, mica particles, glass particles, metal oxide particles (including mixed metal oxide particles), and mixtures thereof. In a preferred embodiment, the inorganic particulate material is a metal oxide, including mixed metal oxides. In another preferred embodiment, the inorganic particulate material is silica.

In certain embodiments, the inorganic particulate material can be surface-treated to modify the properties of the virgin inorganic particulate material. For example, an inorganic particulate material having hydroxy groups on its surface can be treated with an alkoxysilane compound, which reacts with the hydroxy groups to attach the compound to the surface of the inorganic particulate material. In a preferred embodiment, the inorganic particulate material is surface-treated with an alkoxysilane compound comprising one or more aryl groups, preferably phenyl groups. Further, as described below, the inorganic particulate material can be surface-treated with the aminosilane compound.

The inorganic particulate material can be present in the first part in any suitable amount. The inorganic particulate material preferably is present in the first part in an amount of about 0.1 wt. % or more, based on the total weight of the first part. In another preferred embodiment, the inorganic particulate material is present in the first part in an amount of about 0.5 wt. % or more or about 1 wt. % or more, based on the total weight of the first part. The inorganic particulate material preferably is present in the first part in an amount of about 10 wt. % or less, based on the total weight of the first part. In another preferred embodiment, the inorganic particulate material is present in the first part in an amount of about 9 wt. % or less, about 8 wt. % or less, about 7 wt. % or less, about 6 wt. % or less, about 5 wt. % or less, or about 4 wt. % or less based on the total weight of the first part. Thus, in a series of preferred embodiments, the inorganic particulate material is present in the first part in an amount of about 0.1 wt. % to about 10 wt. %, about 0.5 wt. % to about 10 wt. % (e.g., about 1 wt. % to about 10 wt. %), about 0.5 wt. % to about 9 wt. %, about 0.5 wt. % to about 8 wt. %, about 0.5 wt. % to about 7 wt. %, about 0.5 wt. % to about 6 wt. %, about 0.5 wt. % to about 5 wt. % (e.g., about 1 wt. % to about 5 wt. %), or about 0.5 wt. % to about 4 wt. % (e.g., about 1 wt. % to about 4 wt. %), based on the total weight of the first part.

As noted above, the first part comprises an aminosilane compound in addition to the first siloxane compound and the inorganic particulate material. The aminosilane compound can be present as a separate component within the first part (i.e., as a component that is separately added to provide the first part). The aminosilane compound can also be present on or attached to the surface of the inorganic particulate material, such as a silica particle that has been surface-treated with the aminosilane compound. Also, in certain embodiments, the aminosilane compound can be present in both ways, with a portion being present as a separate component within the first part and another portion being present on or attached to the surface of the inorganic particulate material.

The aminosilane compound present in the first part can be any suitable aminosilane compound. In a preferred embodiment, the aminosilane compound is an amino-functional alkoxysilane compound. In such an embodiment, the aminosilane compound preferably conforms to the structure of Formula (C)

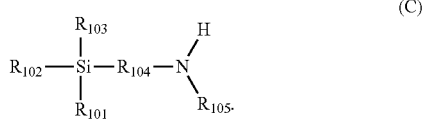

(C)

In the structure of Formula (C), $R_{101}$, $R_{102}$, and $R_{103}$ are independently selected from the group consisting of alkyl groups and alkoxy groups, provided at least one of $R_{101}$, $R_{102}$, and $R_{103}$ is an alkoxy group. $R_{104}$ is an alkanediyl group, and $R_{105}$ is selected from the group consisting of hydrogen, —$R_{106}$—$NH_2$, and —$R_{107}$—N(H)—$R_{108}$—$NH_2$, where $R_{106}$, $R_{107}$, and $R_{108}$ are independently selected from the group consisting of alkanediyl groups. Preferably, $R_{101}$, $R_{102}$, and $R_{103}$ are independently selected from the group consisting of $C_1$-$C_4$ alkyl groups (more preferably, methyl and ethyl groups) and $C_1$-$C_4$ alkoxy groups (more preferably, methoxy and ethoxy groups). Preferably, $R_{104}$ is selected from the group consisting of $C_1$-$C_4$ alkanediyl groups, with propane-1,3-diyl being particularly preferred. In another preferred embodiment, $R_{106}$, $R_{107}$, and $R_{108}$ are independently selected from the group consisting of $C_1$-$C_4$ alkanediyl groups, with propane-1,3-diyl being particularly preferred. In a preferred embodiment, the aminosilane compound is selected from the group consisting of (3-aminopropyl)trimethoxysilane, (3-aminopropyl)-methyl-dimethoxysilane, (3-aminopropyl)-dimethyl-methoxysilane, (3-aminopropyl)triethoxysilane, (3-aminopropyl)-ethyl-diethoxysilane, (3-aminopropyl)-diethyl-ethoxysilane, and mixtures thereof. In another preferred embodiment, the aminosilane compound is (3-aminopropyl)trimethoxysilane.

The aminosilane compound can be present in the first part in any suitable amount. The aminosilane compound preferably is present in the first part in an amount of about 50 ppm or more, based on the total weight of the first part. In another preferred embodiment, the aminosilane compound is present in the first part in an amount of about 100 ppm or more, based on the total weight of the first part. The aminosilane compound preferably is present in the first part in an amount of about 5,000 ppm or less, about 2,000 ppm or less, about 1,000 ppm or less, or about 500 ppm or less, based on the total weight of the first part. Thus, in a series of preferred embodiments, the aminosilane compound is present in the first part in an amount of about 50 ppm to about 5,000 ppm (e.g., about 50 ppm to about 2,000 ppm, about 50 ppm to about 1,000 ppm, or about 50 ppm to about 500 ppm) or about 100 ppm to about 5,000 ppm (e.g., about 100 ppm to about 2,000 ppm, about 100 ppm to about 1,000 ppm, or about 100 ppm to about 500 ppm), based on the total weight of the first part.

The first part can optionally comprise a cure inhibitor in addition to the first siloxane compound, the inorganic particulate material, and the aminosilane compound. When present, the cure inhibitor preferably is selected from the group consisting of (i) Lewis acids, (ii) compounds comprising a labile hydrogen bonded to an atom having an electronegativity greater than the electronegativity of a silicon atom, and (iii) mixtures thereof. In a preferred embodiment, the cure inhibitor is a compound comprising a labile hydrogen bonded to an atom having an electronegativity greater than the electronegativity of a silicon atom. In such an embodiment, the cure inhibitor can be a relatively small, discrete compound (e.g., triphenylsilanol), a macromolecule (e.g., an MQ silicone resin comprising silanol groups), or an inorganic compound or inorganic particulate (e.g., silica comprising silanol groups). In a preferred embodiment, the cure inhibitor comprises one or more silanol groups. In a more specific embodiment, the cure inhibitor comprises one or more silanol groups of Formula (LXX)

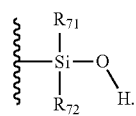

(LXX)

In the structure of Formula (LXX), $R_{71}$ and $R_{72}$ are selected from the group consisting of alkyl groups and aryl groups. More preferably, $R_{71}$ and $R_{72}$ are selected from the group consisting of $C_1$-$C_8$ alkyl groups and $C_6$-$C_{10}$ aryl groups. More preferably, $R_{71}$ and $R_{72}$ are selected from the group consisting of methyl groups and phenyl groups. In a preferred embodiment, the cure inhibitor is selected from the group consisting of triphenylsilanol, silanol-terminated poly(diphenylsiloxanes), silanol-terminated poly(phenylmethylsiloxanes), silanol-terminated poly(diphenylsiloxane-co-dimethylsiloxanes), MQ resins comprising silanol groups, silicas (e.g., colloidal silicas), and mixtures thereof. Suitable MQ resins comprising silanol groups preferably are treated to provide a substantial percentage (e.g., about 25% to about 75%, about 40% to about 70%, or about 50% to about 60%) of phenyl-terminated M units. In such an embodiment, the remaining M units are terminated with hydroxy groups (which are bonded to silicon atoms to provide silanol groups). Suitable silicas will comprise silanol groups (for example, on the surface of the silica particles) and preferably are surface treated with materials comprising phenyl groups. While not wishing to be bound to any particular theory, it is believed that providing phenyl functionality to such cure inhibitors enhances the compatibility of these cure inhibitors with the other component(s) of the first part. In a particularly preferred embodiment, the cure inhibitor is triphenylsilanol. In another preferred embodiment, the cure inhibitor is a Lewis acid, such as triphenylborane, boric acid, and mixtures thereof.

The cure inhibitor can be present in the first part in any suitable amount. The suitable amount of cure inhibitor can depend upon several factors. For example, the suitable amount of cure inhibitor can depend, at least in part, on the strength of the inhibiting effect exhibited by the cure inhibitor, the unit mass (e.g., molar mass) of the cure inhibitor, and the desired degree of cure inhibition (in other words, the degree to which the pot life is to be extended). Preferably, the cure inhibitor is present in the composition in an amount of about 50 ppm or more based on the total weight of the first part. The cure inhibitor is more preferably present in the first part in an amount of about 100 ppm or more, about 200 ppm or more, about 500 ppm or more, about 1,000 ppm or more, about 2,500 ppm or more, about 5,000 ppm or more, or about 7,500 ppm or more based on the total weight of the first part. The amount of cure inhibitor present in the first part preferably is about 200,000 ppm or less, more preferably about 100,000 ppm or less, more preferably about 50,000 ppm or less, or more preferably about 25,000 ppm or less based on the total weight of the first part. In a series of preferred embodiments, the cure inhibitor is present in the first part in an amount of about 50 ppm to about 200,000 ppm, more preferably about 100 ppm to about 50,000 ppm based on the total weight of the first part.

As noted above, the second part comprises a hydroxide salt (i.e., a salt comprising the hydroxide anion). Hydroxide salts suitable for use in the method of the invention can comprise any suitable cation. In a preferred embodiment, the cation of the hydroxide salt is selected from the group consisting of a lithium cation, a sodium cation, a potassium cation, ammonium cations, and phosphonium cations. More preferably, the cation of the hydroxide salt is selected from the group consisting of alkylammonium cations and alkylphosphonium cations. Suitable alkylammonium cations include, but are not limited to, the tetraethylammonium cation, the tetrapropylammonium cation, and the tetrabutylammonium cation. Suitable alkylphosphonium cations include, but are not limited to, the tetraethylphosphonium cation, the tetrapropylphosphonium cation, and the tetrabutylphosphonium cation. In a particularly preferred embodiment, the cation of the hydroxide salt is selected from the group consisting of the tetramethylammonium cation, the tetrabutylammonium cation, and the tetrabutylphosphonium cation, with the tetrabutylphosphonium cation being particularly preferred.

Thus, in a preferred embodiment, the second part comprises a hydroxide salt selected from the group consisting of lithium hydroxide, sodium hydroxide, potassium hydroxide, ammonium hydroxides, phosphonium hydroxides, and mixtures thereof. More preferably, the second part comprises a hydroxide salt selected from the group consisting of lithium hydroxide, sodium hydroxide, potassium hydroxide, tetramethylammonium hydroxide, tetrabutylammonium hydroxide, tetrabutylphosphonium hydroxide, and mixtures thereof. More preferably, the second part comprises a hydroxide salt selected from the group consisting of tetramethylammonium hydroxide, tetrabutylammonium hydroxide, tetrabutylphosphonium hydroxide, and mixtures thereof. In another preferred embodiment, the second part comprises tetrabutylphosphonium hydroxide.

In addition to the hydroxide salt, the second part typically comprises a liquid medium in which the hydroxide salt is dispersed or dissolved. While not necessary for the practice of the invention, utilizing a second part comprising a liquid medium facilitates handling and mixing of the second part with the first part. The liquid medium can be any suitable liquid that is compatible with the siloxane compound(s) present in the first part. Preferably, the liquid medium is a liquid siloxane compound (e.g., a silicone fluid). Suitable liquid siloxane compounds include, but are not limited to, poly(dimethylsiloxane), poly(methylphenylsiloxane), poly(diphenylsiloxane), poly(dimethylsiloxane-co-methylphenylsiloxane), poly(dimethylsiloxane-co-diphenylsiloxane), poly(diphenylsiloxane-co-methylphenylsiloxane), and mixtures thereof. In a preferred embodiment, the second part comprises a liquid medium, and the liquid medium is a poly(dimethylsiloxane-co-methylphenylsiloxane).

When the second part comprises a liquid medium, the hydroxide salt can be present in the liquid medium in any suitable concentration. The concentration of the hydroxide salt within the liquid medium preferably is selected to facilitate handling and storage of the second part as well as mixing of the second part with the first part. For example, the concentration of the hydroxide salt should not be so high that the hydroxide salt cannot be dispersed or dissolved in the liquid medium. On the other hand, the concentration of the hydroxide salt should not be so low that a large volume of the second part must be used in order to provide a sufficient amount of hydroxide salt to trigger the curing reaction. Preferably, the hydroxide salt is present in the liquid medium at a concentration of about 1,000 ppm or more, more preferably about 2,500 ppm or more, more preferably about 5,000 ppm or more, or more preferably about 7,500 ppm or more based on the total weight of the components of the second part. In another preferred embodiment, the hydroxide salt is present in the liquid medium at a concentration of about 100,000 ppm or less, more preferably about 50,000 ppm or less, more preferably about 25,000 ppm or less, more preferably about 20,000 ppm or less, more preferably about 15,000 ppm or less, or more preferably about 12,500 ppm or less. Thus, in a series of preferred embodiments, the hydroxide salt is present in the liquid medium at a concentration of about 1,000 ppm to about 100,000 ppm, more preferably about 2,500 ppm to about 50,000 ppm, more preferably about 5,000 ppm to about 25,000 ppm, more preferably about 5,000 ppm to about 20,000 ppm, more preferably about 7,500 ppm to about 15,000 ppm. In one preferred embodiment, the hydroxide salt is present in the liquid medium at a concentration of about 7,500 ppm to about 12,500 ppm (e.g., about 10,000 ppm).

As noted above, the first part and the second part are combined to produce a reaction mixture. When the first part and the second part are both liquids, the two parts can simply be dispensed in a suitable vessel and thoroughly mixed by any suitable mechanical means. In this step, the first part and the second part can be combined in any suitable relative amounts. The suitable relative amounts can depend on several factors, such as the concentration of hydroxide salt in the second part and the amount of cyclic siloxane compounds in the first part. Preferably, the first part and second part are combined in a relative amount of about 10 parts by weight or more of the first part to about 1 part by weight of the second part. In another preferred embodiment, the first part and second party are combined in a relative amount of about 40 parts by weight or less of the first part to about 1 part by weight of the second part. In a series of preferred embodiments, the first part and the second part are combined in a relative amount of about 10 parts by weight to about 40 parts by weight of the first part to about 1 part by weight of the second part or about 15 parts by weight to about 30 parts by weight of the first part to about 1 part by weight of the second part.

Once the first part and the second part are combined to produce the reaction mixture, the reaction mixture preferably is heated to an elevated temperature. By heating the reaction mixture to an elevated temperature, the hydroxide salt opens the ring of the cyclic siloxane moiety present in the first siloxane compound. In particular, the hydroxide anions attack a siloxane linkage (—Si—O—Si—) in the cyclic siloxane moiety and cleave the linkage to produce two silanolate ions, the charges of which are balanced by cations originating from the hydroxide salt. The siloxane linkages present in the cyclic siloxane moiety are believed to be particularly susceptible to cleavage by the hydroxide anion due to the strain present in those bonds from the cyclic arrangement. Once the cyclic siloxane moieties are opened by the hydroxide salt, the resulting ring-opened moieties (the silanolate ions) on the compound then react with other molecules in the composition to produce cross-links between different molecules in the composition, which ultimately results in the cross-linked siloxane network.

The reaction mixture can be heated to any suitable temperature. Preferably, the reaction mixture is heated to a temperature of about 100° C. or more. In a preferred embodiment, the reaction mixture is heated to a temperature of about 110° C. or more, about 120° C. or more, about 130° C. or more, about 140° C. or more, or about 150° C. or more. The reaction mixture preferably is not heated to a temperature of above 200° C. In the practice of the method, the reaction mixture can be heated and maintained at a first elevated temperature, and then maintained at a second elevated temperature that is different from (either above or below) the first elevated temperature. For example, in a preferred embodiment, the reaction mixture is heated to and maintained at a first elevated temperature of about 120° C. or about 130° C. for about 1 hour and then heated to and maintained at a second elevated temperature of about 150° C. for about 1 hour.

The reaction mixture can be maintained at the elevated temperature(s) for any suitable amount of time. Generally, the reaction mixture is maintained at the elevated temperature(s) for a sufficient amount of time for the ring-opening and subsequent cross-linking reactions to proceed to substantial completion. In a preferred embodiment, the reaction mixture is maintained at the elevated temperature(s) for a total time of about 30 minutes or more, more preferably about 60 minutes or more, more preferably about 90 minutes or more, or more preferably about 120 minutes or more.

The ring-opening polymerization that produces the cross-linked siloxane network is initiated by the hydroxide salt, such as tetrabutylphosphonium hydroxide. The inventors found that strong bases, such as tetrabutylphosphonium hydroxide, would produce compositions that cured to form the cross-linked siloxane network in a relatively short period of time (even at ambient temperatures) after the components (the first part and the second part) were combined. While fast curing may be desired in certain applications, there are some applications in which end-users desire compositions that have a "pot life" or "working time" of several hours (e.g., about 7 or about 8 hours) at ambient temperatures. Accordingly, the inventors sought a means to moderate the activity of the base at ambient temperatures (to provide longer pot life and working time) while not deleteriously affecting the cure time at elevated temperatures or the properties of the finished elastomer. Surprisingly, the inventors found that adding a cure inhibitor (as described above) extended the pot life of the reaction mixture and still produced a composition exhibiting the desired properties. While not wishing to be bound to any particular theory, it is believed that certain cure inhibitors (those bearing silanol groups) react with the hydroxide salt to produce silanolate ions. Further, it is believed that these silanoloate ions (from the cure inhibitor) are, at ambient temperatures, less basic than the hydroxide salt and the silanolate ions produced by the ring-opening of the cyclic siloxane moieties in the first siloxane compound. This means that these silanolate ions (from the cure inhibitor) are, at ambient temperatures, slower to initiate the ring-opening of the first siloxane compound, which extends the cure time (and pot life) of the reaction mixture at ambient temperatures. Further, it is believed that as the temperature of the reaction mixture increases, the basicity of these silanolate ions (from the cure inhibitor) increases, which permits these silanolate ions to more rapidly initiate the ring-opening polymerization of the first siloxane compound and the reaction mixture to cure to a cross-linked siloxane network in a desired time.

The cross-linked siloxane polymer produced from the method described above can be used in many applications. For example, the cross-linked siloxane polymer can be used as an encapsulant for light emitting diodes (LEDs). Because the cross-linked silicone polymer can be made from raw materials containing relatively large amounts of groups that increase the refractive index of the polymer (e.g., haloalkyl groups, aralkyl groups, aryl groups, substituted aryl groups, heteroaryl groups, and substituted heteroaryl groups), it is believed that the cross-linked silicone polymer can be particularly effective as an encapsulant for high intensity LEDs. In such applications, an encapsulant having a higher refractive index provides a progressive transition from the relatively high refractive index of the semiconductor crystal (where the light is produced on the LED) to the air surrounding the LED. The relatively large difference between the refractive index of the semiconductor crystal and the surrounding air leads to internal reflection of light within the LED's semiconductor crystal. These internal reflections reduce the amount of light that escapes from the semiconductor crystal and is emitted by the LED. By providing a medium with an intermediate refractive index (i.e., a refractive index between the high refractive index of the semiconductor crystal and the refractive index of air), the encapsulant material (i.e., the cross-linked silicone polymer) can reduce the amount of light that is internally reflected back into the semiconductor crystal, thereby increasing the amount of light emitted by the LED. This use of similar cross-linked silicone polymers is described, for example, in U.S. patent application Ser. No. 14/244,236 filed on Apr. 3, 2014, which application published as U.S. Patent Application Publication No. 2014/0306259 on Oct. 16, 2014 and is hereby incorporated by reference for its disclosure of methods of making such encapsulant materials and uses for the same.

The following examples further illustrate the subject matter described above but, of course, should not be construed as in any way limiting the scope thereof.

EXAMPLE 1

This example demonstrates the production of a composition according to the invention and the production of a cross-linked silicone elastomer from the composition.

A first part ("Part A") was prepared by combining (i) a siloxane compound comprising cyclotrisiloxane repeating units conforming to the structure of Formula (XL), (ii) a siloxane compound conforming to the structure of Formula (XX), (iii) a siloxane compound conforming to the structure of Formula (LX), and (iv) 2,2,4,4,-tetramethyl-6,6-diphenylcyclotrisiloxane ("diphenyl-$D_3$"). The siloxane compound comprising cyclotrisiloxane repeating units conforming to the structure of Formula (XL) was a polymer having a mass average molar mass of approximately 15,000 g/mol. In the repeating units conforming to the structure of Formula (XL), the groups $R_{41}$ and $R_{42}$ were methyl groups, and the groups $R_{43}$ and $R_{44}$ were phenyl groups. In addition to the repeating units conforming to the structure of Formula (XL), the polymer contained trimethylsilyl terminating groups. In the compound conforming to the structure of Formula (XX), the variables a and d were 0, the variables b and c were 1, the groups $R_{23}$, $R_{24}$, $R_{25}$, $R_{26}$, and $R_{27}$ were methyl groups, and the groups $R_{21}$ and $R_{22}$ were phenyl groups. In the compound conforming to the structure of Formula (LX), the groups $R_{63}$, $R_{64}$, $R_{66}$, $R_{67}$, $R_{68}$, and $R_{69}$ were methyl groups, and $R_{61}$, $R_{62}$, and $R_{65}$ were phenyl groups. The four components of Part A were combined in the following proportions: (i) 30 parts by weight of the polymer containing repeating units conforming to the structure of Formula (XL); (ii) 35 parts by weight of the compound conforming to the structure of Formula (XX); (iii) 15 parts by weight of the compound conforming to the structure of Formula (LX); and (iv) 20 parts by weight of diphenyl-$D_3$.

A second part ("Part B") was prepared by mixing tetrabutylphosphonium hydroxide in a phenylmethyl silicone fluid (PM-125 from Clearco Products). The concentration of tetrabutylphosphonium hydroxide in Part B was approximately 10,000 ppm.

A reaction mixture ("Sample 1") was prepared by mixing 25 parts by weight of Part A and 1 part by weight of Part B. A portion of Sample 1 was then cured at a temperature of approximately 100° C. for approximately 1 hour and then at a temperature of approximately 150° C. for another hour. The resulting silicone elastomer exhibited a durometer hardness of Shore A 53. Another portion of Sample 1 was cured at a temperature of approximately 135° C. for approximately 1 hour and then at a temperature of approximately 150° C. for another hour. The resulting silicone elastomer exhibited a durometer hardness of Shore A 46. This data shows that the higher cure temperature of 135° C., which allowed the reaction mixture to gel more quickly, reduced the hardness by seven units.

Six additional reaction mixtures (Samples 2-7) were prepared by adding inorganic particulate materials and aminosilane compounds to the first part ("Part A") described above. The type and amount of each component are described in Table 1 below. In table 1, the abbreviation "AMMO" is used to refer to (3-aminopropyl)trimethoxysilane. Samples 2 and 3 were produced using the same commercially available, phenyl-treated colloidal silica. Samples 4 and 5 were produced using the same commercially available, aminosilane-treated fumed silica. Samples 6 and 7 were produced using another commercially available, aminosilane-treated fumed silica.

Two portions of each reaction mixture were cured to produce silicone elastomers. The first portion of each reaction mixture was cured at 100° C. for approximately 1 hour and then at a temperature of approximately 150° C. for another hour. The second portion of each reaction mixture was cured at 135° C. for approximately 1 hour and then at a temperature of approximately 150° C. for another hour. The durometer hardness of each silicone elastomer was measured, and the values are reported in Table 1 below.

TABLE 1

Composition, cure temperature, hardness, and change in hardness for Samples 1-7.

| Sample | Part A Additional Components | Cure Temp. (° C.) | Durometer Hardness (Shore A) | Hardness Change |
|---|---|---|---|---|
| 1 | — | 100 | 53 | −7 |
|   |   | 135 | 46 |   |
| 2 | 300 ppm AMMO 3 wt. % phenyl-treated colloidal silica | 100 | 48 | 0 |
|   |   | 135 | 48 |   |
| 3 | 300 ppm AMMO 1.5 wt. % phenyl-treated colloidal silica | 100 | 53 | 5 |
|   |   | 135 | 48 |   |
| 4 | 1.4 wt. % aminosilane-treated fumed silica | 100 | 58 | 6 |
|   |   | 135 | 52 |   |
| 5 | 3 wt. % aminosilane-treated fumed silica | 100 | 57 | 2 |
|   |   | 135 | 55 |   |
| 6 | 1.4 wt. % aminosilane-treated fumed silica | 100 | 55 | 5 |
|   |   | 135 | 50 |   |
| 7 | 3 wt. % aminosilane-treated fumed silica | 100 | 56 | 5 |
|   |   | 135 | 51 |   |

As can be seen from the data in Table 1, the addition of the inorganic particulate material and the aminosilane compound (either as a separate component or as a surface-treatment on the inorganic particulate material) reduces the decrease in hardness observed at higher cure temperatures. Indeed, the elastomers produced from Sample 2 showed no change in hardness when cured at higher temperatures. These results demonstrate how the method and compositions of the invention can be used to produce silicone elastomers that gel quickly (thereby avoiding settling of particles in the reaction mixture) and yet retain sufficiently high levels of hardness.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for producing a cross-linked siloxane network, the method comprising the steps of:
   (a) providing a first part comprising (i) a first siloxane compound comprising at least two cyclic siloxane moieties, (ii) an inorganic particulate material, and (iii) an aminosilane compound, wherein, optionally, at least a portion of the aminosilane compound is disposed on the surface of the inorganic particulate material;
   (b) providing a second part, the second part comprising a hydroxide salt;
   (c) combining the first part and the second part to produce a reaction mixture;
   (d) heating the reaction mixture to a temperature sufficient for the hydroxide salt to open the ring of the cyclic siloxane moiety; and
   (e) maintaining the reaction mixture at an elevated temperature so that at least a portion of the opened cyclic siloxane moieties react to produce a cross-linked siloxane network.

2. The method of claim 1, wherein the first part further comprises a second siloxane compound, and the second siloxane compound comprises at least one cyclic siloxane moiety.

3. The method of claim 1, wherein the inorganic particulate material is a metal oxide.

4. The method of claim 3, wherein the inorganic particulate material is silica.

5. The method of claim 1, wherein the inorganic particulate material is present in the first part in an amount of about 0.5 wt. % to about 10 wt. % based on the total weight of the first part.

6. The method of claim 1, wherein at least a portion of the aminosilane compound is disposed on the surface of the inorganic particulate material.

7. The method of claim 1, wherein the aminosilane compound is an amino-functional alkoxysilane compound.

8. The method of claim 7, wherein the aminosilane compound conforms to the structure of Formula (C)

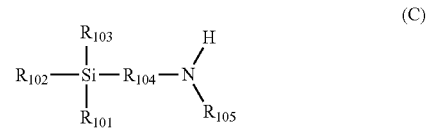

wherein $R_{101}$, $R_{102}$, and $R_{103}$ are independently selected from the group consisting of alkyl groups and alkoxy groups, provided at least one of $R_{101}$, $R_{102}$, and $R_{103}$ is an alkoxy group, $R_{104}$ is an alkanediyl group, and $R_{105}$ is selected from the group consisting of hydrogen, —$R_{106}$—$NH_2$, and —$R_{107}$—N(H)—$R_{108}$—$NH_2$, where $R_{106}$, $R_{107}$, and $R_{108}$ are independently selected from the group consisting of alkanediyl groups.

9. The method of claim 8, wherein the aminosilane compound is selected from the group consisting of (3-aminopropyl)trimethoxysilane, (3-aminopropyl)-methyl-dimethoxysilane, (3-aminopropyl)-dimethyl-methoxysilane, (3-aminopropyl)triethoxysilane, (3-aminopropyl)-ethyl-diethoxysilane, (3-aminopropyl)-diethyl-ethoxysilane, and mixtures thereof.

10. The method of claim 1, wherein aminosilane compound is present in the first part in an amount of about 100 ppm or more, based on the total weight of the first part.

11. The method of claim 1, wherein the hydroxide salt comprises a cation selected from the group consisting of a lithium cation, a sodium cation, a potassium cation, ammonium cations, and phosphonium cations.

12. The method of claim 11, wherein the cation is selected from the group consisting of ammonium cations and phosphonium cations.

13. The method of claim 12, wherein the hydroxide salt is selected from the group consisting of tetramethylammonium hydroxide, tetrabutylammonium hydroxide, tetrabutylphosphonium hydroxide, and mixtures thereof.

14. The method of claim 13, wherein the hydroxide salt is tetrabutylphosphonium hydroxide.

15. The method of claim 1, wherein the reaction mixture is heated to a temperature of about 120° C. or more.

* * * * *